(12) United States Patent
O'Rourke et al.

(10) Patent No.: US 7,395,194 B2
(45) Date of Patent: Jul. 1, 2008

(54) INFORMATION MANAGEMENT AND CONTROL SYSTEM

(75) Inventors: Richard Sean O'Rourke, Montasterevin (IE); David O'Rourke, Montasterevin (IE); Kevin Keenan, Mountrath (IE)

(73) Assignee: Kinematik Research Limited, Cork (IE)

( * ) Notice: Subject to any disclaimer, the term of this patent is extended or adjusted under 35 U.S.C. 154(b) by 733 days.

(21) Appl. No.: 10/737,741

(22) Filed: Dec. 18, 2003

(65) Prior Publication Data

US 2004/0143834 A1    Jul. 22, 2004

Related U.S. Application Data

(63) Continuation of application No. PCT/IE02/00096, filed on Jul. 3, 2002.

(30) Foreign Application Priority Data

Jul. 4, 2001    (IE)    ................................. 2001/0621

(51) Int. Cl.
*G06G 7/48* (2006.01)

(52) U.S. Cl. .................... 703/6; 703/2; 703/11; 703/12; 702/81

(58) Field of Classification Search ...... 703/2, 703/6, 12, 13; 706/15, 46
See application file for complete search history.

(56) References Cited

U.S. PATENT DOCUMENTS

| 5,301,301 | A | | 4/1994 | Kodosky et al. ............ 395/500 |
| 5,623,592 | A | | 4/1997 | Carlson et al. ............. 395/348 |
| 5,878,262 | A | | 3/1999 | Shoumura et al. .......... 395/710 |
| 6,044,212 | A | * | 3/2000 | Flavin et al. .................... 703/6 |
| 6,175,816 | B1 | * | 1/2001 | Flavin et al. .................. 703/13 |
| 6,820,070 | B2 | * | 11/2004 | Goldman et al. ............. 706/46 |
| 6,853,966 | B2 | * | 2/2005 | Bushey et al. ................. 703/13 |
| 6,952,688 | B1 | * | 10/2005 | Goldman et al. ............. 706/45 |
| 7,050,950 | B2 | * | 5/2006 | Goebel .......................... 703/2 |
| 7,079,965 | B2 | * | 7/2006 | Burghaus et al. ............. 702/81 |
| 2001/0034756 | A1 | | 10/2001 | Kan et al. .................... 709/203 |
| 2002/0052858 | A1 | * | 5/2002 | Goldman et al. ............. 706/15 |

(Continued)

FOREIGN PATENT DOCUMENTS

WO    WO97/15877    5/1997

(Continued)

OTHER PUBLICATIONS 25 and 30-38 are rejected under 35 U.S.C. 103(a) as being unpatentable over "Design-Ease Software Version 6 User's Guide" Stat-Ease Inc. Copyright 2000.*

(Continued)

*Primary Examiner*—Fred Ferris
(74) *Attorney, Agent, or Firm*—Jacobson Holman PLLC

(57) ABSTRACT

A system (1) has a server (2) linked with PC clients (5), in turn connected to test equipment (10). A design-of-experiment (DOE) engine (20) generates a series of run objects (21), each defining a variation of an equipment run. The inputs to the DOE engine (20) are a selected procedure object (25) and experiment variations. The engine (20) automatically determines all task objects (26), resource objects (27), and parameter configuration objects (28) linked with the selected procedure object (25). The variations may be variations in the hierarchical links and/or different values for the parameter configurations (28). There is a run object (21) associated with each variation permutation.

21 Claims, 4 Drawing Sheets

U.S. PATENT DOCUMENTS

2002/0120432 A1* 8/2002 Ager et al. ............... 703/12

FOREIGN PATENT DOCUMENTS

WO     WO00/70490     11/2000
WO     WO01/79949     10/2001

OTHER PUBLICATIONS

"Conducting Experiments With Experiment Manager", M. Angel, pp. 535-541, Proceedings 1996 Winter Simulation Conference ACM 1996.*

R. Jamal, L. Wenzel, The applicability of the visual programming language LabVIEW to large real-world applications, 11th International IEEE Symposium on Visual Languages, Sep. 1995, pp. 99-106.

G. M. Vose, G. Williams, LabView: Laboratory Virtual Instrument Engineering Workbench, BYTE, Sep. 1986, pp. 84-92.

Jamal, Nuclear Instr & Meth Ni Physics Research . . . , vol. A352, No. 1, Dec. 15, 1994, pp. 438-441, Graphical object-oriented . . . .

Barber, Adv in Instrum & Control . . . , vol. 44, No. Part 3, 1989, pp. 1259-1266, Labview: An Implementation of Data Flow . . . .

* cited by examiner

| eNovator Project Procedure. AFLP | | | | eNovator |
|---|---|---|---|---|
| Search LiveLink for [From here] [▼] [Go] Advanced | | | | Tue, 25 Jun 2002 |
| | | | | Project▾ Personal▾ Enterprise▾ Tools▾ Help▾ |
| AFLP [▼][≡] | | | | |

Procedure Evolution Map

| Name | Info | Version | State | Modified | Actions |
|---|---|---|---|---|---|
| ⇅ Procedure | ☒ | | | 06/19/2002 12:06 PM | |
| ⇅ Procedure Version 1 | ☒ | 1 | Usable | 05/08/2002 05:57 PM | |
|   ⇅ Procedure Version 4 | ☒ | 4 | New | 05/08/2002 04:32 PM | |
| ⇅ Procedure Version 10 | ☒ | 10 | Usable | 06/19/2002 11:27 AM | |
| ⇅ Procedure Version 2 | ☒ | 2 | Usable | 05/08/2002 05:58 PM | |
|   ⇅ Procedure Version 3 | ☒ | 3 | Usable | 05/08/2002 05:58 PM | |
| ⇅ Procedure Version 6 | ☒ | 6 | Usable | 05/15/2002 11:56 PM | |
| ⇅ Procedure Version 8 | ☒ | 8 | Usable | 06/17/2002 03:09 PM | |
| ⇅ Procedure Version 5 | ☒ | 5 | Usable | 05/29/2002 10:21 AM | |
|   ⇅ Procedure Version 11 | ☒ | 11 | Usable | 06/19/2002 11:53 AM | |
|   ⇅ Procedure Version 13 | ☒ | 13 | Usable | 06/19/2002 12:12 PM | |
|   ⇅ Procedure Version 14 | ☒ | 14 | Usable | 06/19/2002 12:12 PM | |
|   ⇅ Procedure Version 12 | ☒ | 12 | Usable | 06/19/2002 11:55 PM | |
|   ⇅ Procedure Version 15 | ☒ | 15 | Usable | 06/19/2002 12:23 PM | |
|   ⇅ Procedure Version 16 | ☒ | 16 | Usable | 06/19/2002 12:04 PM | |
|   ⇅ Procedure Version 17 | ☒ | 17 | Usable | 06/19/2002 12:05 PM | |
|   ⇅ Procedure Version 18 | ☒ | 18 | Usable | 06/19/2002 12:24 PM | |
| ⇅ Procedure Version 7 | ☒ | 7 | New | 06/17/2002 03:06 PM | |
| ⇅ Procedure Version 9 | ☒ | 9 | Usable | 06/17/2002 04:46 PM | |

Fig.4

INFORMATION MANAGEMENT AND CONTROL SYSTEM

This is a continuation of PCT/IE02/00096 filed Jul. 3, 2002 and published in English.

FIELD OF THE INVENTION

The invention relates to information management for control of experiment procedures and management of the empirical data generated by the procedures.

PRIOR ART DISCUSSION

Research and development is often a very expensive activity, with large sums being spent on materials, equipment, and personnel. This is inevitable to some extent because of the complexity of much of the equipment which is required and the highly skilled nature of the work. However, there is much room for improvement in utilisation of both equipment resources and personnel in order to reduce costs.

Some systems have been developed to assist with experiment control. For example, PCT Patent Specification No. WO01/79949 describes a system which stores experiment protocols, in which a protocol is linked to a stored library description. Also, PCT Patent Specification No. WO00/70490 describes a system for controlling multiple automated sample procedures. United States Patent Specification No. US2001/0034756 describes a system for designing, managing, and controlling a bioscience experiment. It appears that these systems assist with achieving greater efficiency in execution of experiment procedures. However, it also appears that there is limited flexibility in terms of the range of experiments which can be controlled using these systems. It also appears that users are required to have extensive knowledge of the systems to use them.

The invention is therefore directed towards providing a system for control of experiment procedures which:
  allows a wide variety of experiment procedures to be controlled;
  optimises user time for good efficiency; and
  is easy to understand and operate.

SUMMARY OF THE INVENTION

According to the invention, there is provided an information management and control system comprising processing means for generating experiment instructions for equipment, and an interface comprising means for receiving user inputs, wherein the processing means comprises:
  means for storing a library of reusable objects defining research process components; and
  a design of experiment engine for generating an experiment run object by instantiating a plurality of said library objects linked by inheritance.

In one embodiment, the library comprises a procedure object linked as a container to a plurality of other objects in a structure defining an experiment.

In another embodiment, the library comprises a plurality of task objects defining procedure steps.

In a further embodiment, the task objects are linked in a child relationship to one or more procedure objects.

In one embodiment, the library comprises a plurality of resource objects defining equipment or material to be used for steps of an experiment.

In another embodiment, each resource object is linked to at least one associated task object in a child relationship.

In a further embodiment, the library comprises a plurality of parameter objects, each defining parameters for use of an item of material or equipment defined by an associated resource object.

In one embodiment, the engine comprises means for generating a run object defining instructions for an experiment run, and for generating a subsequent run object for each variation of an experiment.

In another embodiment, the engine comprises means for instantiating the objects for an experiment in a manner to minimise the number of run objects which are required.

In a further embodiment, the engine comprises means for allowing selection of a procedure object, and for automatically retrieving all other objects linked by inheritance to the selected procedure object.

In one embodiment, the engine comprises means for determining an experiment variation for each permutation of:—
  different values for parameters associated with resource objects; and
  different hierarchy of reusable objects linked to the procedure object.

In another embodiment, the engine comprises means for automatically generating a graphical display of a hierarchy of objects linked to a procedure object, and for allowing a user to graphically edit the links to input a modified hierarchical structure.

In a further embodiment, the engine comprises means for automatically generating different allowed parameter values according to attributes of the associated resource objects.

In one embodiment, the system comprises a mapping function comprising means for automatically determining all procedure objects associated with a project, and for automatically outputting data of said procedure objects including an audit trail of modifications to said procedure objects.

In another embodiment, the system comprises a procedure builder function comprising means for grouping task objects and making associations between each task object and resource objects, and between each resource object and parameter objects under user instructions.

In a further embodiment, the procedure builder function comprises means for graphically displaying the task object links.

In another embodiment, the processing means comprises means for defining a collaborative workspace for each series of experiment runs, and for storing all empirical data for the runs in said workspace.

In a further embodiment, the processing means comprises means for storing the empirical data in a database structure which mirrors that of the object structure for the associated experiment.

In one embodiment, the system comprises an analysis tool comprising means for automatically processing result data retrieved from a workspace using one of a plurality of analysis processes selected by a user.

DETAILED DESCRIPTION OF THE INVENTION

Brief Description of the Invention

The invention will be more clearly understood from the following description of some embodiments thereof, given by way of example only with reference to the accompanying drawings in which:—

FIG. 4 is a sample screen display of the system.

DESCRIPTION OF THE EMBODIMENTS

Figure 1:
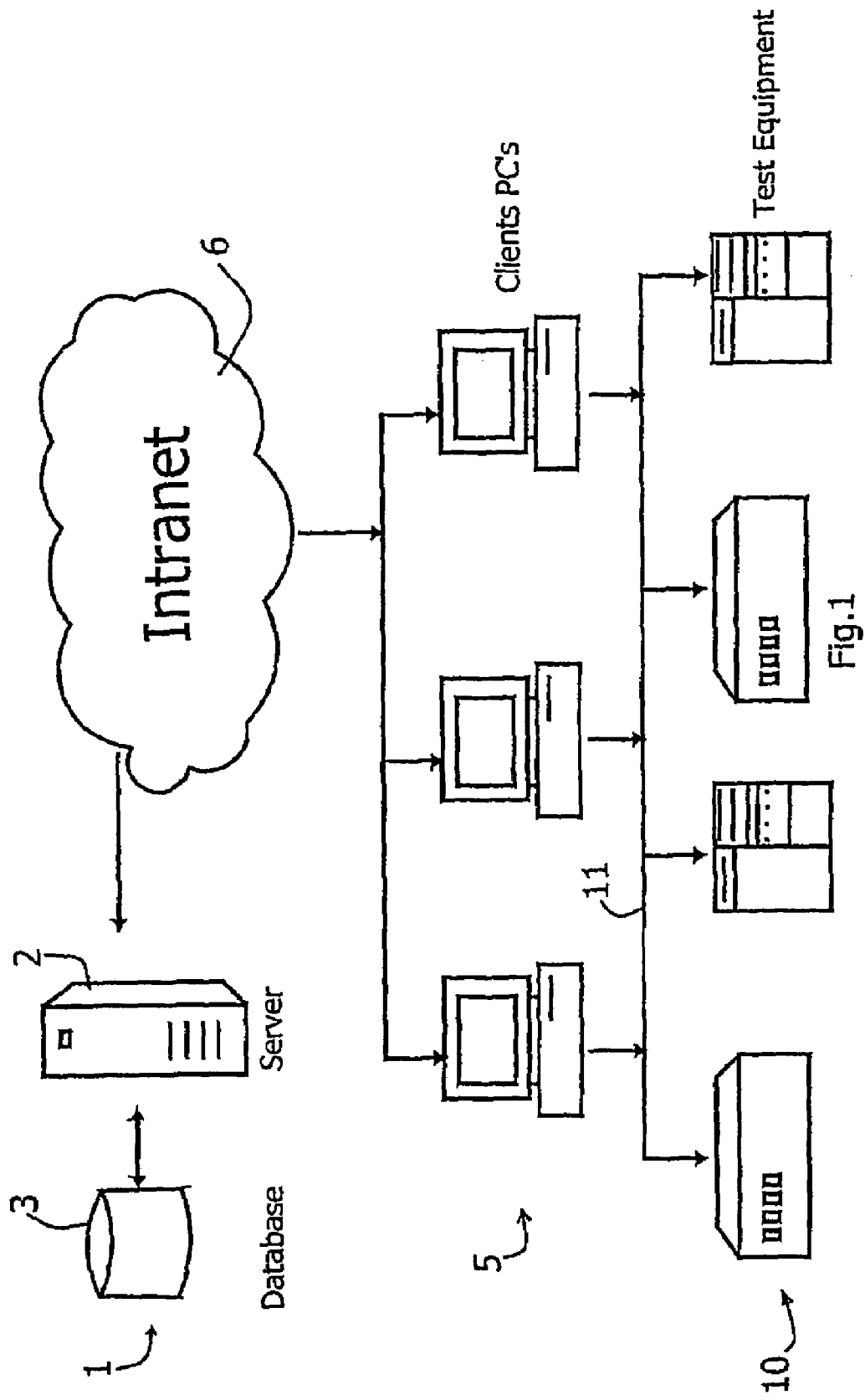
FIG. 1 is a diagram illustrating a system of the invention connected to test equipment.

Referring to FIG. 1 an information management and control system 1 comprises a server 2 having a database 3. The server 2 is connected to clients PCs 5 via an intranet 6. The PCs 5 are in turn connected to a suite of test equipment 10 via a LAN 11. The equipment 10 includes flow control meters, thermometers, and spectrometers. The test equipment may, for example, in addition or alternatively include voltmeters, microscopes, and instrument power supplies.

Figure 2:
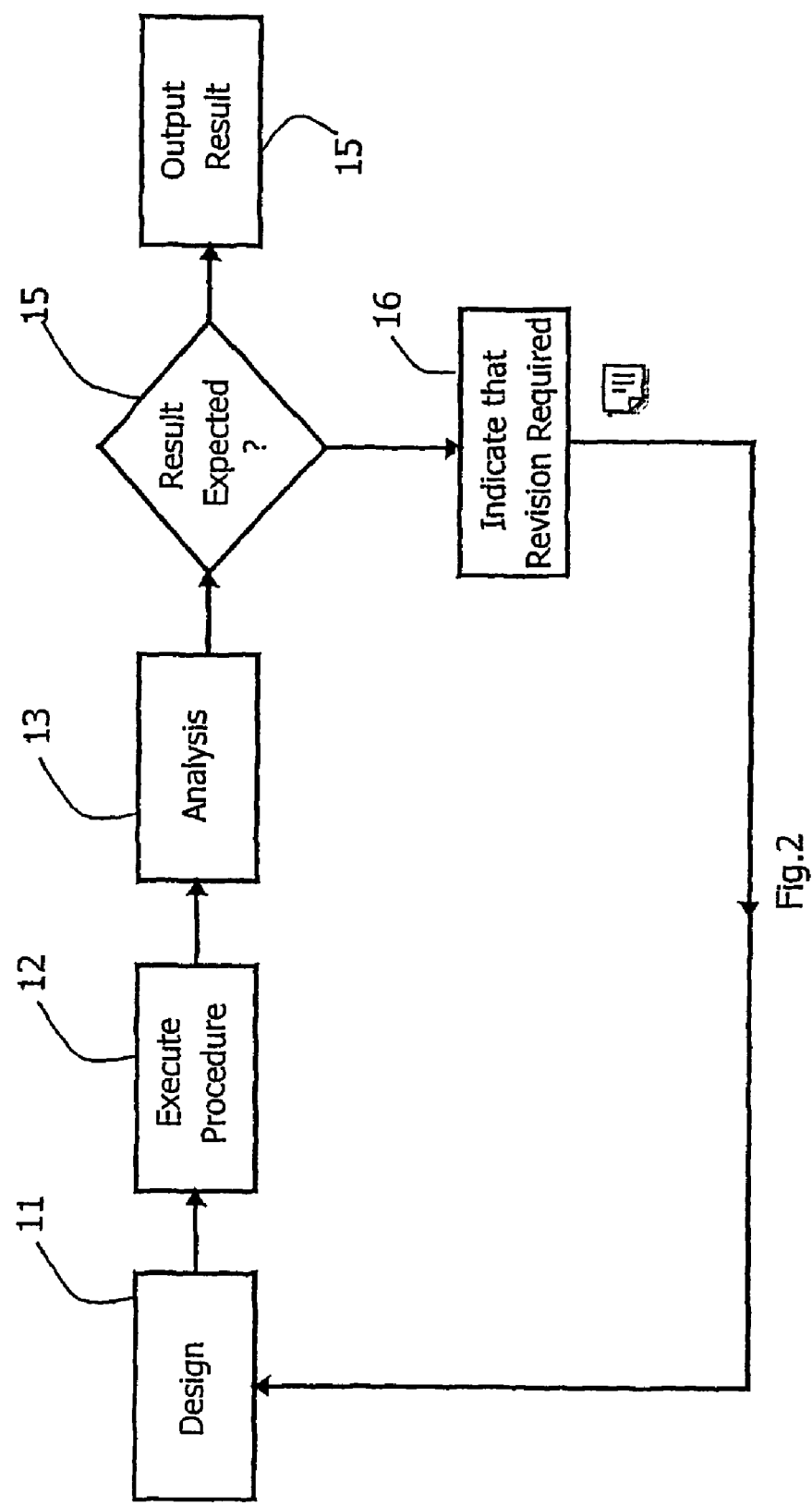
FIG. 2 is a flow diagram illustrating operation of the system.

Referring to FIG. 2 the system 1 performs the following primary steps.

1. Design 11 of an experiment procedure with excellent versatility.
2. Control 12 of execution of the procedure with a degree of user control of the resources depending on the nature of the resources.
3. Analysis 13 of the empirical data.
4. Decision 14 on whether the result was expected. If so it is outputted in step 15, and if not in step 16 it outputs an indication that procedure revision is required.

In addition, the system performs a feedback loop from the result step 16 if the result is not in an expected range. This involves revision of the design in a manner which requires only simple inputs from the user and a large degree of automation.

Figure 3:
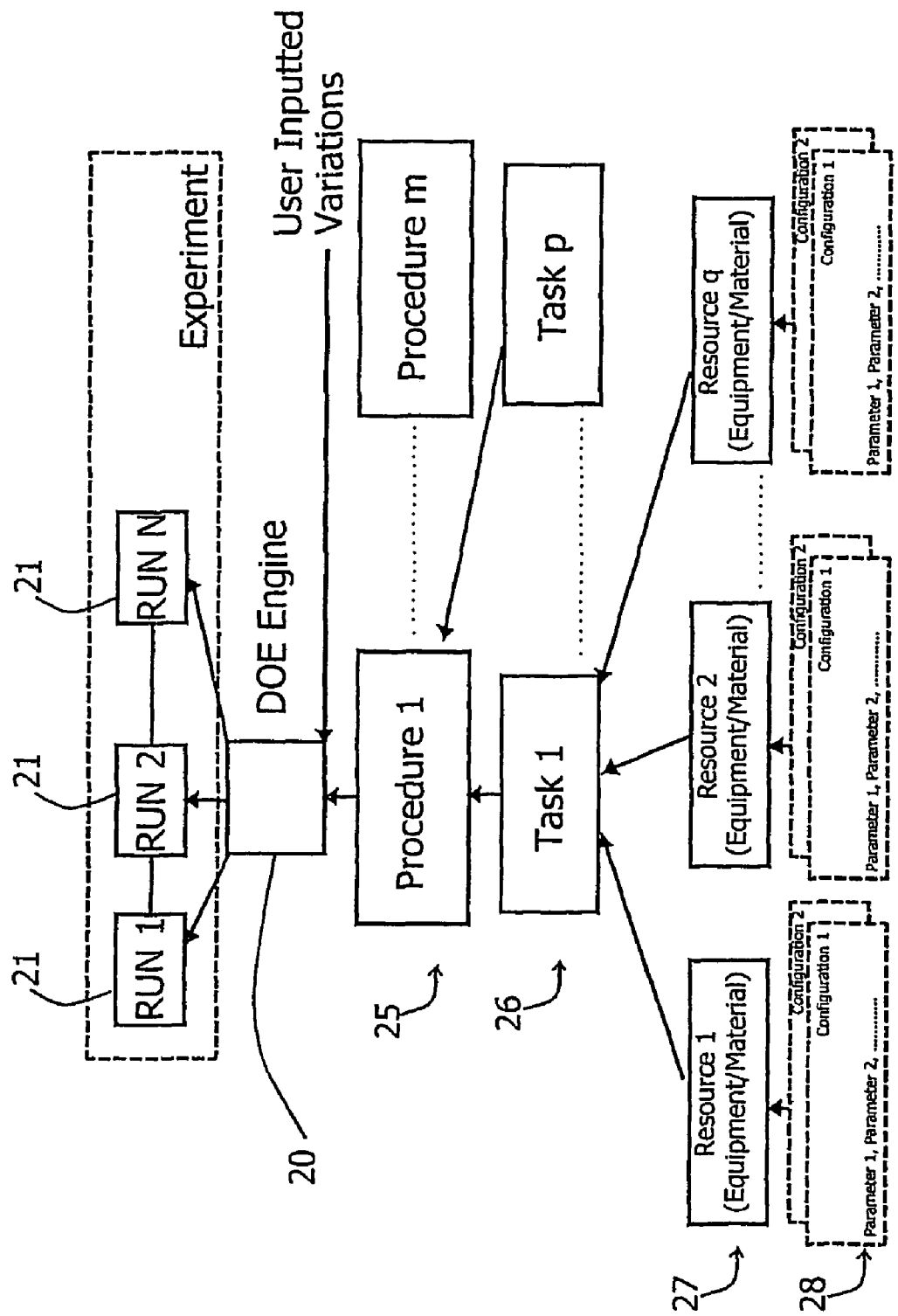
FIG. 3 is a diagram showing architecture of the system.

Referring to FIG. 3 the internal structure of the server is shown. A design-of-experiment (DOE) engine 20 automatically generates run objects 21 for a succession of N runs for an experiment 22. The input for the engine 20 is one of m procedure objects 23 linked to up to p task objects 26. Each task object 26 is in turn linked with up to q resource objects. Further, each resource object 27 has attributes of user-inputted parameter configurations 28.

Thus, each procedure object 25 is a container of reusable objects defining an experiment procedure in terms of the experiment tasks (or operations) to be performed, resources (equipment or materials) to be used for each task, and parameters to be controlled for each resource. Each run object 21 is generated with a fresh set of variations such as actual values for the parameters 28. The variations may be automatically generated according to the analysis step 13 (performed by a separate analysis module in the server 2).

The server 2 maintains an experiment workspace containing all details relating to an experiment (details, procedure, results, members, analysis, and conclusions) for access by all of the experiment member clients 5, who in line with their authorisations can add notes and edit information according to their assigned role in the experiment.

A procedure evolution map shows an overview and status of each experiment procedure as defined in a procedure builder applet downloaded from the server 2. The map provides access to the complete evolution history, allowing users to see what was done, and when and which changes were made over time to eventually create the results. The evolution map shows all the procedures which have been created within a particular research project. Each procedure is listed with its associated creation date. Any procedures which have been based on another procedure will be nested under that original procedure. Each procedure within the procedure evolution map will have its own audit trail, showing what changes have been made to it, by whom and why. A display of nested procedures is shown in FIG. 4.

The procedure builder applet automatically displays the tasks of the run objects 21 and also defines the order in which those tasks should be carried out for an experiment to be conducted. The tasks are grouped together using a task folder.

Also, the procedure builder applet configures, edits and creates task objects 26 for use by the DOE engine 20 in generating run objects 21. Configuring a task involves specifying the resources 27 that a task should contain, the resource parameters 27 and the value ranges for those resources parameters.

When a procedure is first created, the procedure builder applet will be empty. The user can then search for tasks either in the task library, in other procedures (including standard operating procedures) or in other experiments. This search can be conducted using one or more of the following search criteria in any Boolean combination:

Name

Date created

Who created it

What resources were used

Once the search returns the tasks that fit the search criteria, the user can decide which tasks should be selected for use in the current procedure by dragging and dropping them into place in the procedure builder. This effectively establishes the structure illustrated in FIG. 2, ready for the DOE engine 20 to instantiate an experiment object 22 followed by successive run objects 21.

Each run object 21 can be an exact copy of the original procedure (first run object 21), in which case each run is termed a replicate of the original procedure. Each run object 21 can have variations introduced which make each run similar to the original procedure but not exactly the same. By completing these run objects the researcher hopes to see how the variations which were introduced affect the final output or result of the experiment. The nature of the variations is described in more detail below.

A resource library allows users to create resource objects (for ovens, lab equipment for example) for addition to the library. Resources can either be equipment or materials. A resource must be created before it can be used in a task. Resources in turn contain parameters. In the case of equipment resources which are programmable, the system can capture each step and parameter involved in the program. When a resource is created its parameters can be given specific values (configurations).

Users can create tasks which can use one or more resources in the library. These resources are grouped together under the task and instructions are added in how to carry out the task. When selecting a resource for a task, a specific configuration can also be selected or a new one created. A SOP (standard operating procedure) library contains standard operating procedures which can be re-used in the system 1 as procedures.

The design of experiment (DOE) engine 20 converts procedures to run objects 21. It allows the researcher to select what they wish to vary and then produces resultant runs of the experiment, each run being a different substantiation of the original procedure. The tool implements a number of processes which are configured to minimise the number of run objects 21 that are required, given a fixed number of factors which are to be varied. The user first specifies which procedure is to be used as an input to the engine 20. The user then specifies which DOE process he wishes to use to generate the experiment.

In more detail, the DOE engine 20 operates as follows.

(a) It takes as an input one of the procedures. A procedure is defined by a procedure object 25 and the hierarchical tree of tasks 26, resources 27, and parameter configurations 28 linked to it.
(b) Another input to the DOE engine 20 is an instruction from the user as to how the experiment may be varied. There are two main types of variable factors as follows:—
   (i) different values for the parameters of the relevant parameter configurations 28, and
   (ii) variations in the hierarchical links beneath the relevant procedure object 25, for example, deleting or adding tasks or deleting or adding resources.
(c) The variations of (b) are inputted in an interactive manner, in which the engine 20 prompts the user with graphical display of the hierarchical links, and allows graphical on-screen modification of the links.
(d) The DOE engine 20 automatically determines the number of permutations arising from the variations. Thus, for example, if there are three sets of parameter values and three different procedure hierarchies, the engine 20 will determine that there are $3^2$ (nine) different experiment runs required to cover all permutations.
(e) A run object 21 is generated to define equipment inputs and other instructions for executing an experiment for each permutation.

When the run objects 21 have been created, they are ready to be completed. To complete them, all the results are either entered manually or captured directly from the measurement equipment via a LAN or WAN. This data is then saved to the database 3 and linked to the tasks 26 in which it was captured, the run in which the task is contained, the experiment in which the run is, the procedure on which the experiment is based and the project in which all of this is saved. This data is then filtered using a variety of criteria and made available to the data analysis tool for analysis.

The user can specify which result parameters the system is to analyse and which experiments or runs to analyse them over. The user can analyse the data to ensure that the results are objective rather than judgmental in nature. He/she can also measure the relationship between the input parameters and the output parameters of the experiment.

The analysis tool uses selected output parameter values as its input. The user can then choose one of the following analysis processes across one or more of the selected parameters:
1) Basic tools: Plotting parameters on XY graphs, scatterplots, and barcharts.
2) Summary Statistics: summary statistics and graphical displays for multiple columns of numeric data.
3) Sample analysis: analysing a sample of data from a single or several populations.
4) Time series analysis such as descriptive statistics, seasonal decomposition and forecasting future values.
5) Regression analysis—fitting a curve to the results.
6) Analysis of variance using anova techniques.
7) Statistical process control tools such as Pareto charts to help achieve process stability.

Through these methods the user can differentiate between experimental error or naturally occurring variations and actual dependencies between the selected parameters. The results of these analyses can be saved in the system for future reference or for inclusion in reports.

A metric library contains an editable list of the metrics used within the system.

Referring to FIG. 4 a set of procedure objects 22 of a particular project are displayed on a client 5 in an easy-to-understand nested configuration. A number of experiments are nested under the Procedure Version 5 experiment, for example. A single experimental objective is implemented by a task type, alternatively referred to as a "task". It is defined through the hierarchy which specifies the parameter set, the equipment program which is executed, and materials used. Each execution which generates data is represented by a run object 21. The system 1 can re-use configurations of parameter values, thus facilitating very quick set-up for experimental runs and helping to ensure data integrity. Results are linked directly to versions of program types, material types, and equipment types, thus providing structured representation and traceability of results which are recorded.

The system 1 provides comprehensive control for preparation of experiments and for collection of the result data. The latter may be retrieved according to program, materials, or equipment and also according to any of the parent objects to these objects. Because of linking of the various aspects of experimental work in the hierarchical nature described above, there is excellent flexibility in choice of experiments within any project. At the same time the links impose a controlled structure, which ensures both data integrity and traceability.

The most valuable assets in a research organisation are codified knowledge and staff expertise. Together they define the intellectual assets of the company. The invention provides an effective technical platform for converting these intellectual assets into intellectual capital—the basis of new products. From a user perspective the following benefits are obtained:
1. Productivity improvement: Access to prior research data lets the scientist focus on new research.
2. Collaboration: Data processed by the system 1 can be made available to all or specific associates and researchers (regardless of their location) promoting joint programs and knowledge sharing.
3. Information retention: Current paper notebooks tend to be only of real value to the scientist who created the information in the first place. The system promotes the storage of information in a standardised format. It therefore remains accessible even if the scientist who documented the information is no longer with the organisation.
4. Standardisation of procedures: The 'Design of Experiment' (DOE) engine 20 standardises procedures for the optimisation and execution of experiments and recording the associated results. Data can be easily cross referenced and test results can be duplicated easily in the future as all parameters of the original experiment are known.
5. Reduction of administrative overload: The systematic filing of data combined with ease of reporting and organisation wide knowledge sharing reduces the need for paperwork.
6. Management control: As the project process is visible to every authorised user in a standardised format, control and co-ordination is simple. Management can effectively monitor performance to budget and schedule at the touch of a button.

The invention may be applied to any application involving empirical work other than scientific experiments. For example, it may be applied to surveys.

The invention is not limited to the embodiments described but may be varied in construction and detail.

The invention claimed is:
1. An information management and control system comprising processing means for generating experiment instructions for test equipment, and an interface comprising means for receiving user inputs and means for performing analysis of empirical data, characterized in that, the processing means comprises:

means for storing a library of reusable objects defining research process components, wherein the library comprises an experiment procedure object linked as a container to reusable objects defining an experiment procedure in terms of experiment tasks to be performed, equipment or materials resources to be used for each task, and parameters to be controlled for each resource, said reusable objects being:
   a plurality of task objects defining experiment procedure steps, said tasks objects being linked in a child relationship to one or more procedure objects, and
   a plurality of resource objects defining equipment or material to be used for steps of an experiment, including objects for equipment resources which are programmable and include each step and parameter involved in a program for the equipment, each resource object being linked to at least one associated task object in a child relationship and having attributes of user-inputted parameter configurations, and
a design of experiment engine for generating an experiment run object by instantiating a plurality of said library objects linked by inheritance, wherein the engine comprises means for generating a run object defining test equipment instructions for an experiment run, and for generating a subsequent run object for each variation of an experiment,
wherein the engine comprises means for allowing selection of a procedure object, and for automatically retrieving all other objects linked by inheritance to the selected procedure object, in which one of m procedure objects is linked to up to p task objects, and each task object is linked with up to q resource objects.

2. The information management and control system as claimed in claim 1, wherein the design of experiment engine comprises means for automatically generating different allowed parameter values according to attributes of the associated resource objects.

3. The information management and control system as claimed in claim 1, wherein the design of experiment engine comprises means for determining an experiment variation for each permutation of:
   different values for parameters associated with resource objects, and different hierarchy of reusable objects linked to the procedure object.

4. The information management and control system as claimed in claim 1, wherein the design of experiment engine comprises means for automatically generating an experiment variation according to the analysis step.

5. The information management and control system as claimed in claim 1, wherein the processing means comprises means for storing the empirical data in a database structure which mirrors that of the object structure for the associated experiment, the data being linked to the tasks in which it was captured, the run in which the task is contained, the experiment in which the run is, and the procedure on which the experiment is based.

6. The information management and control system as claimed in claim 1, wherein the processing means executes on a server having a database and being linked to client computers.

7. The information management and control system as claimed in claim 1, wherein the processing means comprises means for defining a collaborative workspace for each series of experiment runs, and for storing all empirical data for the runs in said workspace.

8. The information management and control system as claimed in claim 7, wherein the analysis means comprises means for automatically processing result data retrieved from the workspace using one of a plurality of analysis processes selected by a user.

9. The information management and control system as claimed in claim 7, wherein the processing means also stores in the workspace data concerning members, analysis, and conclusions, and allows access to the workspace by experiment members using the client computers, and for the members to add notes and edit information in line with their authorizations and assigned roles in the experiment.

10. The information management and control system as claimed in claim 1, wherein the processing means filters the result data and makes it available to the analysis means for analysis.

11. The information management and control system as claimed in claim 1, wherein the design of experiment engine operates such that each run object can be an exact copy of the first run object whereby a run is a replicate of the original procedure.

12. The information management and control system as claimed in claim 1, wherein the processing means comprises means for generating an evolution map which shows all procedures which have been created within a particular research project, in which any procedure which has been based on another procedure is nested under the original procedure, and each procedure within the evolution map has an audit trail showing what changes have been made to it, by whom and why.

13. The information management and control system as claimed in claim 1, wherein the design of experiment engine comprises means for instantiating the objects for an experiment in a manner to minimize the number of run objects which are required.

14. The information management and control system as claimed in claim 1, wherein the design of experiment engine comprises means for automatically generating a graphical display of a hierarchy of objects linked to a procedure object, and for allowing a user to graphically edit the links to input a modified hierarchical structure.

15. The information management and control system as claimed in claim 1, wherein the processing means comprises a mapping function comprising means for automatically determining all procedure objects associated with a project, and for automatically outputting data of said procedure objects including an audit trail of modifications to said procedure objects.

16. The information management and control system as claimed in claim 1, wherein the system comprises a procedure builder function comprising means for grouping task objects and making associations between each task object and resource objects, and between each resource object and parameter objects under user instructions.

17. The information management and control system as claimed in claim 16, wherein the procedure builder function comprises means for graphically displaying the task object links.

18. A computer program product comprising software code for performing operations of a system as claimed in claim 1 when executing on a digital computer.

19. An information management and control system comprising processing means for generating experiment instructions for test equipment, and an interface comprising means for receiving user inputs and means for performing analysis of empirical data, characterized in that,
   the processing means comprises:

means for storing a library of reusable objects defining research process components, wherein the library comprises an experiment procedure object linked as a container to reusable objects defining an experiment procedure in terms of experiment tasks to be performed, equipment or materials resources to be used for each task, and parameters to be controlled for each resource, said reusable objects being:

a plurality of task objects defining experiment procedure steps, said task objects being linked in a child relationship to one or more procedure objects, and a plurality of resource objects defining equipment or material to be used for steps of an experiment, including objects for equipment resources which are programmable and include each step and parameter involved in a program for the equipment, each resource object being linked to at least one associated task object in a child relationship and having attributes of user-inputted parameter configurations, and a design of experiment engine for generating an experiment run object by instantiating a plurality of said library objects linked by inheritance, wherein the engine comprises means for generating a run object defining test equipment instructions for an experiment run, and for generating a subsequent run object for each variation of an experiment, wherein the engine comprises means for allowing selection of a procedure object, and for automatically instantiating all other objects linked by inheritance to the selected procedure object, in which one of m procedure objects is linked to up to p task objects, and each task object is linked with up to q resource objects;

wherein the engine comprises means for automatically generating different allowed parameter values according to attributes of the associated resource objects;

wherein the engine comprises means for determining an experiment variation for each permutation of:
different values for parameters associated with resource objects, and
different hierarchy of reusable objects linked to the procedure object;

wherein the engine comprises means for automatically generating an experiment variation according to the analysis step; and wherein the processing means comprises means for storing the empirical data in a database structure which mirrors that of the object structure for the associated experiment, the data being linked to the tasks in which it was captured, the run in which the task is contained, the experiment in which the run is, and the procedure on which the experiment is based.

20. An information management and control system comprising processing means for generating experiment instructions for test equipment, and an interface comprising means for receiving user inputs and means for performing analysis of empirical data, characterized in that, the processing means comprises:

means for storing a library of reusable objects defining research process components, wherein the library comprises an experiment procedure object linked as a container to reusable objects defining an experiment procedure in terms of experiment tasks to be performed, equipment or materials resources to be used for each task, and parameters to be controlled for each resource, said reusable objects being:

a plurality of task objects defining experiment procedure steps, said task objects being linked in a child relationship to one or more procedure objects, and a plurality of resource objects defining equipment or material to be used for steps of an experiment, including objects for equipment resources which are programmable and include each step and parameter involved in a program for the equipment, each resource object being linked to at least one associated task object in a child relationship and having attributes of user-inputted parameter configurations, and a design of experiment engine for generating an experiment run object by instantiating a plurality of said library objects linked by inheritance, wherein the engine comprises means for generating a run object defining test equipment instructions for an experiment run, and for generating a subsequent run object for each variation of an experiment, in which each run object can be an exact copy of the first run object whereby a run is a replicate of the original procedure, wherein the engine comprises means for allowing selection of a procedure object, and for automatically instantiating all other objects linked by inheritance to the selected procedure object, in which one of m procedure objects is linked to up to p task objects, and each task object is linked with up to q resource objects;

wherein the engine comprises means for automatically generating different allowed parameter values according to attributes of the associated resource objects;

wherein the engine comprises means for determining an experiment variation for each permutation of:
different values for parameters associated with resource objects, and
different hierarchy of reusable objects linked to the procedure object;

wherein the engine comprises means for automatically generating an experiment variation according to the analysis step;

wherein the processing means comprises means for storing the empirical data in a database structure which mirrors that of the object structure for the associated experiment, the data being linked to the tasks in which it was captured, the run in which the task is contained, the experiment in which the run is, and the procedure on which the experiment is based;

wherein the processing means executes on a server having a database and being linked to client computers;

the processing means comprises means for defining a collaborative workspace for each series of experiment runs, and for storing all empirical data for the runs in said workspace;

the analysis means comprises means for automatically processing result data retrieved from the workspace using one of a plurality of analysis processes selected by a user;

wherein the processing means also stores in the workspace data concerning members, analysis, and conclusions, and allows access to the workspace by experiment members using the client computers, and for the members to add notes and edit information in line with their authorizations and assigned roles in the experiment; and the processing means filters the result data and makes it available to the analysis means for analysis, the processing means comprises means for generating an evolution map which shows all procedures which have been created within a particular research project, in which any procedure which have been based on another procedure is nested under the original procedure, and each procedure within the evolution map has an audit trail showing what changes have been made to it, by whom and why.

21. An information management and control system comprising processing means for generating experiment instructions for test equipment, and an interface comprising means for receiving user inputs and means for performing analysis of empirical data, characterized in that, the processing means comprises:
  means for storing a library of reusable objects defining research process components, wherein the library comprises an experiment procedure object linked as a container to reusable objects defining an experiment procedure in terms of experiment tasks to be performed, equipment or materials resources to be used for each task, and parameters to be controlled for each resource, said reusable objects being:
    a plurality of task objects defining experiment procedure steps, said task objects being linked in a child relationship to one or more procedure objects, and
    a plurality of resource objects defining equipment or material to be used for steps of an experiment, including objects for equipment resources which are programmable and include each step and parameter involved in a program for the equipment, each resource object being linked to at least one associated task object in a child relationship and having attributes of user-inputted parameter configurations, and
  a design of experiment engine for generating an experiment run object by instantiating a plurality of said library objects linked by inheritance, wherein the engine comprises means for generating a run object defining test equipment instructions for an experiment run, and for generating a subsequent run object for each variation of an experiment, in which each run object can be an exact copy of the first run object whereby a run is a replicate of the original procedure,
wherein the engine comprises means for allowing selection of a procedure object, and for automatically instantiating all other objects linked by inheritance to the selected procedure object, in which one of m procedure objects is linked to up to p task objects, and each task object is linked with up to q resource objects;
wherein the engine comprises means for automatically generating different allowed parameter values according to attributes of the associated resource objects;
wherein the engine comprises means for determining an experiment variation for each permutation of:
  different values for parameters associated with resource objects, and
  different hierarchy of reusable objects linked to the procedure object;
wherein the engine comprises means for automatically generating an experiment variation according to the analysis step;
wherein the processing means comprises means for storing the empirical data in a database structure which mirrors that of the object structure for the associated experiment, the data being linked to the tasks in which it was captured, the run in which the task is contained, the experiment in which the run is, and the procedure on which the experiment is based;
wherein the processing means executes on a server having a database and being linked to client computers;
the processing means comprises means for defining a collaborative workspace for each series of experiment runs, and for storing all empirical data for the runs in said workspace;
the analysis means comprises means for automatically processing result data retrieved from the workspace using one of a plurality of analysis processes selected by a user;
wherein the processing means also stores in the workspace data concerning members, analysis, and conclusions, and allows access to the workspace by experiment members using the client computers, and for the members to add notes and edit information in line with their authorizations and assigned roles in the experiment; and
the processing means filters the result data and makes it available to the analysis means for analysis,
the processing means comprises means for generating an evolution map which shows all procedures which have been created within a particular research project, in which any procedure which have been based on another procedure is nested under the original procedure, and each procedure within the evolution map has an audit trail showing what changes have been made to it, by whom and why;
wherein the engine comprises means for instantiating the objects for an experiment in a manner to minimise the number of run objects which are required;
wherein the engine comprises means for automatically generating a graphical display of a hierarchy of objects linked to a procedure object, and for allowing a user to graphically edit the links to input a modified hierarchical structure;
wherein the system comprises a procedure builder function comprising means for grouping task objects and making associations between each task object and resource objects under user instructions;
wherein the procedure builder function comprises means for graphically displaying the task object links.

* * * * *